United States Patent [19]

Coue

[11] Patent Number: 4,517,450
[45] Date of Patent: May 14, 1985

[54] DETECTING DEVICE IN PARTICULAR FOR DRIVING A BICYCLE COUNTER

[75] Inventor: Maurice Coue, Feucherolles, France

[73] Assignee: Huret et ses Fils, Nanterre, France

[21] Appl. No.: 491,079

[22] Filed: May 3, 1983

[30] Foreign Application Priority Data

May 6, 1982 [FR] France ................. 82 07912

[51] Int. Cl.³ .............................................. G01C 22/00
[52] U.S. Cl. ..................................... 235/95 R; 74/12; 280/289 D
[58] Field of Search ................... 235/1 R, 95 R, 95 B, 235/97, 139 R; 73/527, 528; 74/12, 13; 280/289 D

[56] References Cited

U.S. PATENT DOCUMENTS

| | | | |
|---|---|---|---|
| 2,120,578 | 6/1938 | Schulze | 74/12 |
| 3,781,036 | 12/1973 | Arilando | 74/12 X |
| 4,212,482 | 7/1980 | Rasmussen et al. | 74/12 X |
| 4,354,097 | 10/1982 | Menager | 235/97 X |

FOREIGN PATENT DOCUMENTS 819886 10/1937 France .

OTHER PUBLICATIONS

French patent application Ser. No. 2.208.116, filed Nov. 27, 1972.
Offenlegungsschrift 2143348, Aug. 30, 1971, (Germany).
Offenlegungsschrift 2332154, Jun. 25, 1973, (Germany).

Primary Examiner—Benjamin R. Fuller
Attorney, Agent, or Firm—Trexler, Bushnell & Wolters, Ltd.

[57] ABSTRACT

The detecting device comprises an L-shaped support bracket 1 having a branch 2 on which is rotatively mounted a disc 4 engaged with the rotary element and a second branch 3 which carries a member constituting a bearing for a motion take-off head 19 of a transmission cable 20 or the like. Counter transmission and speed changing means 8 are provided between the disc 4 and the motion take-off head 19. The support 1 and the member 16 constituting a bearing are adapted to be capable of occupying a plurality of different relative positions. A set of counter transmission speed changing means corresponding to the various relative positions of the support and the member constituting a bearing is provided. In this way this detecting device is very easily adaptable to wheels having different diameters.

13 Claims, 2 Drawing Figures

DETECTING DEVICE IN PARTICULAR FOR DRIVING A BICYCLE COUNTER

The present invention relates to devices employed for detecting the motion of a rotary element and transmitting this motion to a measuring apparatus such as a counter. In an application to which the invention is more particularly related, the invention is employed for detecting the motion of a wheel of a vehicle such as a bicycle or the like, and the measuring apparatus is a speedometer and/or a kilometer counter.

A device is known which comprises a support adapted to be fixed to a fixed part of the vehicle and on which are mounted: on one hand, a rotary disc provided with means connecting it to the element whose motion is desired to be detected and, on the other hand, a motion take-off head connected to the measuring apparatus through a cable or some other like transmission means. The axes of the disc and motion take-off head are generally perpendicular to each other and there is provided between these two axes a counter transmission means comprising a gear pinion carried by the motion take-off head and meshed with teeth or notches carried by the disc.

A speed ratio established between the disc and the pinion is chosen in accordance with the diameter of the wheel with which the device is associated so as to obtain a speed or rotation of the cable, and consequently an indication of the counter, which corresponds to the effective speed of the cycle and to the distance effectively travelled through. Consequently, there must be provided for each wheel diameter a different gear pinion and also a different support since the axis of the pinion and the motion take-off of the cable occupies a position which is each time different. Therefore, as many supports as there are types of wheels must be manufactured and this limits the series and increases the cost. This also complicates the assembly and storing operations since as many detecting devices as can be mounted on different wheels must be kept in stock.

This problem is still further increased by the fact that as the counters are provided for a given direction of rotation, the counters are usually mounted on the same side of the wheel. If it is desired for reasons of placement or convenience to dispose the counter on the opposite side of the wheel, means must be provided for reversing the direction of rotation, which means are usually formed by an intermediate gear pinion, having an axis parallel to the first pinion rigid with the motion take-off head and interposed between the rotaty disc and this first pinion. This necessitates the construction of other supports adapted to this configuration.

An object of the invention is consequently to provide a detecting device which overcomes these drawbacks and which may be employed after a very simple adaptation on vehicles provided with wheels of different diameters and indifferently on one side or the other of the wheel.

The invention therefore provides a device for detecting the motion of a rotary element such as a wheel, comprising an L-shaped support bracket on one of the branches of which is rotatively mounted a disc engaged with the rotary element whereas the other branch of the support carries a member constituting a bearing for a motion take-off head of a transmission cable or like means, counter transmission and speed changing means being provided between the disc and said motion take-off head, wherein the support and the member constituting a bearing are adapted to be capable of occupying a plurality of different relative position, and a set of counter transmission and speed changing means is provided, which means correspond to the various relative positions of the support and the member constituting a bearing.

According to other features:

the support bracket has at least one slot in which is engaged the member constituting a bearing, the support bracket and the member having for this purpose complementary guide means;

the member constituting a bearing has a body of polygonal shape and a bearing whose axis is located at a different distance relative to at least some of the sides of the polygon;

The member constituting a bearing and the counter transmission and speed changing means associated therewith carry references.

The invention will be described in more detail hereinafter with reference to the accompanying drawing which is given merely by way of example and in which.

Figure 1:
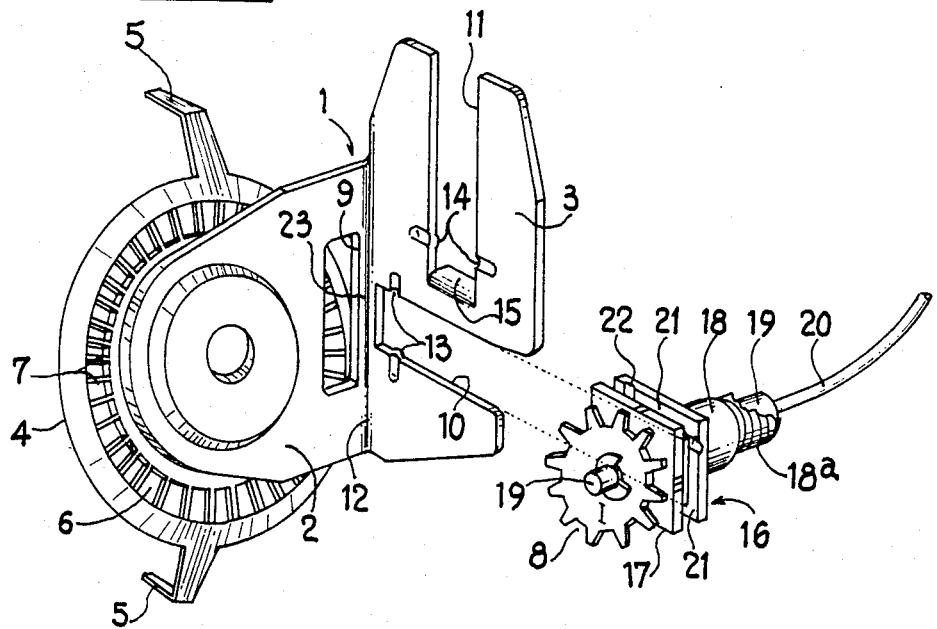
FIG. 1 is an exploded perspective view with a part cut away of a device according to the invention in a first configuration.

FIG. 1 shows a device according to the invention which comprises a support 1 formed by an L-shaped metal bracket having two branches 2 and 3. Rotatively mounted on the first branch 2 is a disc 4 provided with two tabs 5 adapted to engage, in the considered application, with the spokes of a wheel (not shown). This disc has a series of radially extending recesses 6 separated by radially expending teeth 7 and adapted to cooperate with the teeth of a counter transmission and speed changing gear pinion 8. For this purpose, the branch 2 has an opening 9 for the passage of the teeth of this pinion.

In its second branch 3, the support has two slots 10, 11. The first slot 10 extends in a direction perpendicular to the junction edge 12 between the two branches and the second slot 11, which is of the same width, extends in a direction perpendicular to the first slot. Projections 13, 14 are provided adjacent to each of the edges of the two slots, these projections projecting from the outer side of the branch 3. Further, a tab 15, which is cut out and folded, extends from the bottom of the slot 11 and projects from the same outer side of the branch 3 so as to form an abutment for the purpose explained hereinafter.

The device is completed by a member 16 of moulded plastics material which has a body 17 of a roughly parallel-sided shape from which extends a spigot 18 of cylindrical shape which terminates in a screwthreaded end portion 18a. This member 16 constitutes a bearing for a motion take-off head 19 adapted to carry at one end the pinion 8 and to be connected at its opposite end to the adjacent end of a transmission cable 20 which is maintained in position by a member screwed onto the end portion 18a.

The parallel-sided body 17 has in each of its lateral sides a groove 21 whose dimensions are such that the body may be received in the slots 10 and 11 with frictional contact, the groove 21 forming slideways for the edges of these slots. In the inner faces of the grooves 21 there are provided indentations 22 adapted to cooperate with the projections 13 and 14 and thereby constitute retaining means retaining the member 16 in the selected position on the support bracket, as will now be explained.

In the illustrated embodiment, the position of the spigot 18 is so chosen that its axis is located at a different distance from each of the four lateral edges of the parallel-sided body and each of these distances corresponds to a pinion 8 of different diameter and different number of teeth.

It will be understood that the groove 21 and the slot 10 or 11, the projections 13 or 14 and the indentations 22, the four lateral edges of the body 17 are part of means for mounting the member 16 in a plurality of different fixed positions on the support bracket 11.

Further, identification references are provided on each of the lateral edges of the body; these references may for example be formed by lines respectively I, II, III or IIII (two of which references are shown in FIG. 1), numbers 1, 2, 3, 4, letters A, B, C, D, colours or any other suitable identification means. Similar identification references are provided on each of the pinions which may be employed in this arrangement (the reference I is shown on the pinion 8 in FIG. 1 by way of an example).

The detecting device according to the invention is used in the following manner:

In the illustrated construction, the member 16 forming a bearing is provided for mounting in four different positions in the slot 10 of the support 1, it being associated with any one of four pinions 8 having twelve, thirteen, fourteen or sixteen teeth. These pinions respectively correspond to wheels having perimeters of 2.2 m, 2 m, 1.9 m, and 1.6 m. Depending on the type of wheel employed, there is mounted on the member 16 constituting a bearing the corresponding pinion 8 and this member 16 is mounted in the correct position on the support so that the chosen pinion meshes with the disc 4. This position is of course chosen with the aid of the references carried by the edges of the body 17 and the position of said body relative to the support is determined by the abutment of one said edges constituting an abutment against the adjacent abutment portion 23 of the first branch 2 of the support, which is part of the aforementioned means for mounting the member 16 in a plurality of different fixed positions on the support bracket 1. Further, the projections 13 and the indentations 22 constitute male and female retaining means and maintain the member 16 in position relative to the support.

Figure 2:
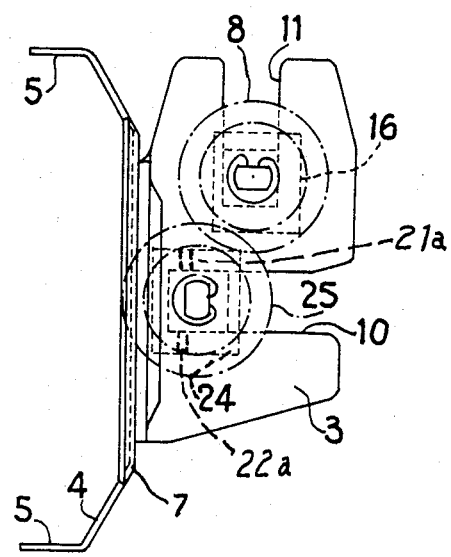
FIG. 2 is a top plan view of this device in a different configuration.

If the device is mounted on the usual or normal side of the wheel, the member 16 constituting a bearing is engaged in the slot 10 (FIG. 1). On the other hand, if the detecting device is mounted on the other side of the wheel, a second configuration of the device as shown in FIG. 2 is used and there is first placed in position a second member 24 which constitutes a bearing like the member 16 and is also provided with grooves 21a performing the same function as the grooves 21 and which is engaged in the slot 10. This member 24 is of very simple construction and includes indentations 22a performing the same function as the identations 22 and merely carries, rotatively mounted on the member 24, an intermediate or idler gear pinion 25 of suitable characteristics as to its teeth. Then the member 16 is placed in position in the second slot 11 in the position corresponding to the type of gear pinion 8 chosen which depends on the diameter of the vehicle wheel, as explained hereinbefore. However, in this configuration, the gear pinion 8 of course meshes with the idler gear pinion 25 and is driven by the disc 4 through this gear pinion 25. Further, the edge of the member 16 abuts against the tab 15 instead of the portion 23 of the branch 2. The projection 14 engages in the indentation 22 of the member 16 and the projection 13 engages in the indentation 22a of the member 24 so that these members are held in their correct positions.

The foregoing description shows that the object of the invention has been attained. Indeed, the assembly comprising the metal support 1 and the disc 4 may be employed for several diameters of wheels and on one side or the other of these wheels. The same is true of the member 16 constituting a bearing, the sole elements which vary from one device to the other being constituted by the pinions 8 or the pairs of pinions 8, 25 in the case of the second configuration shown in FIG. 2. This permits producing only a single support by mass production and consequently with a low cost. The number of parts to be kept in stock is also considerably reduced without this correspondingly complicating the assembly since it is merely necessary to locate the position of the body relative to its support in accordance with the characteristics of the gear pinion it carries.

It will be understood that modifications may be made without departing from the scope of the invention. In particular, the body 17 may have a different shape and have a different number of positions relative to the support. The mounting means whereby this member is mounted on the support may also be different from those described hereinbefore. The support may for example define grooves along the edges of the slots 10, 11 for receiving the member 16 whose edges would be devoid of a groove. The slots receiving the members 16 and 24 may themselves be replaced by equivalent mounting means.

Having now described my invention what I claim as new and desire to secure by Letters Patent is:

1. A device for detecting motion of a rotary element such as a wheel, comprising an L-shaped support bracket having two branches, a disc for drivenly engaging the rotary element and rotatively mounted on one of said branches, a member constituting a bearing, means for mounting said member constituting a bearing on the other of said branches, a motion take-off head of transmission means rotatively mounted in said member constituting a bearing, counter-transmission and speed-changing means interposed between and drivingly interconnecting the disc and said motion take-off head, said mounting means for mounting said member constituting a bearing on said other branch enabling the support bracket and the member constituting a bearing to occupy a plurality of different fixed relative positions, said counter-transmission and speed-changing means being part of a set of counter-transmission and speed-changing means which correspond to the various relative positions of the support bracket and the member constituting a bearing.

2. A detecting device according to claim 1, wherein said mounting means comprise at least one slot in the support bracket in which slot the member constituting a bearing is engaged, the support bracket and the member constituting a bearing having for this purpose complementary guide means.

3. A detecting device according to claim 2, wherein the support bracket and the member constituting a bearing comprise mutual abutment means determining the position of the member constituting a bearing in the slot.

4. A detecting device according to claim 1, wherein the support bracket and the member constituting a bearing have complementary retaining means for retaining the member constituting a bearing in a selected one of said different positions.

5. A detecting device according to claim 1, wherein the member constituting a bearing has a body having edges defining a polygonal shape and a bearing portion having an axis located at a different distance from at least some of said edges of the body of polygonal shape, said means for mounting said member constituting a bearing on said other branch comprising a slot in said other branch and guide means in said at least some edges of said body which guide means cooperate with edges of said slot.

6. A detecting device according to claim 5, wherein said guide means comprise grooves in said at least some edges which grooves cooperate with edges of the slot.

7. A detecting device according to claim 1, wherein the member constituting a bearing and the counter-transmission and speed-changing means associated therewith carry identification references.

8. A detecting device according to claim 2, wherein the support bracket has two slots which are oriented perpendicularly to each other.

9. A detecting device according to claim 3, wherein the abutment means provided on the support bracket are formed by the branch carrying the disc.

10. A detecting device according to claim 3, wherein the abutment means provided on the support bracket are formed by a bent tab which extends from the bottom of the slot.

11. A detecting device according to claim 4, wherein the retaining means comprise respectively male and female means provided on the support bracket and the member constituting a bearing.

12. A detecting device according to claim 2, wherein said disc has radially extending teeth and said counter-transmission and speed-changing means comprise a gear pinion meshed with the teeth of said disc and fixed to said motion take-off head.

13. A detecting device according to claim 2, wherein said disc has gear teeth, the support bracket has two slots which are oriented substantially perpendicularly to each other, and a second member constituting a bearing is engaged in the second slot, said counter-transmission and speed-changing means comprising a first gear pinion rotatively mounted on said second member constituting a bearing and meshed with the gear teeth of said disc, and a second gear pinion mounted on said member constituting a bearing and carrying said motion take-off head which is fixed to said second gear pinion, said second gear pinion being meshed with said first gear pinion so as to be driven by said disc through said first gear pinion, said mounting means enabling said member constituting a bearing and carrying said second gear pinion to occupy a plurality of different fixed positions relative to said first gear pinion in accordance with a selected diameter of said second gear pinion, retaining means being provided for maintaining said second member constituting a bearing in such position in said second slot that said first gear pinion is maintained meshed with the gear teeth of said disc.

* * * * *